(12) United States Patent
Kazaoka

(10) Patent No.: US 12,413,169 B2
(45) Date of Patent: Sep. 9, 2025

(54) POWER CONVERSION APPARATUS

(71) Applicant: DENSO CORPORATION, Kariya (JP)

(72) Inventor: Ryoya Kazaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 152 days.

(21) Appl. No.: 18/377,545

(22) Filed: Oct. 6, 2023

(65) Prior Publication Data

US 2024/0048083 A1   Feb. 8, 2024

Related U.S. Application Data

(63) Continuation of application No. PCT/JP2022/011099, filed on Mar. 11, 2022.

(30) Foreign Application Priority Data

Apr. 9, 2021   (JP) .................... 2021-066577

(51) Int. Cl.
*H02P 27/08* (2006.01)
*H02J 7/00* (2006.01)

(52) U.S. Cl.
CPC ............ *H02P 27/08* (2013.01); *H02J 7/0013* (2013.01)

(58) Field of Classification Search
CPC ........ H02P 29/60; H02P 29/032; H02P 29/40; H02P 29/62; H02P 29/64; H02P 29/68; H02P 2101/45; H02P 2207/05; H02P 27/06; H02P 27/08; H02P 21/04; H02P 21/20; H02P 21/22; H02P 6/28; H02P 3/00; H02P 3/025; H02P 1/26; H02P 27/085; H02P 25/22; H02P 9/30; B60W 2510/246; B60W 2710/244; B60W 2510/087; B60W 30/18118; B60W 2710/105; F02N 2011/0896; F02N 11/0833; F02N 2300/104; F02N 2200/061; F02N 11/0866; H02K 11/33; H02K 23/26; H02K 3/00; H02K 7/025

See application file for complete search history.

(56) References Cited

U.S. PATENT DOCUMENTS

| 6,882,061 | B1 | 4/2005 | Ashtiani et al. | |
| 2009/0167234 | A1* | 7/2009 | Uechi | H02M 1/32 |
| | | | | 180/65.285 |
| 2021/0351684 | A1 | 11/2021 | Nishimura et al. | |

FOREIGN PATENT DOCUMENTS

CN   108306078 A   7/2018

* cited by examiner

*Primary Examiner* — Antony M Paul
(74) *Attorney, Agent, or Firm* — Oliff PLC

(57) ABSTRACT

A power conversion apparatus includes a power converter configured to convert DC power supplied from a battery into AC power by switching control, and is configured to supply the AC power from the power converter to a rotary electric machine having windings. Further, the power conversion apparatus includes a control unit that performs temperature-increase control of the battery by performing switching control of upper arm switches and lower arm switches so that a current flows to the battery via the power converter and the windings. In the temperature-increase control while the vehicle is stopped, the control unit controls the current so that a current value of the rotary electric machine gradually increases within a current control range in which a torque of the rotary electric machine is less than an upper limit torque.

9 Claims, 15 Drawing Sheets

FIG.3
(a)
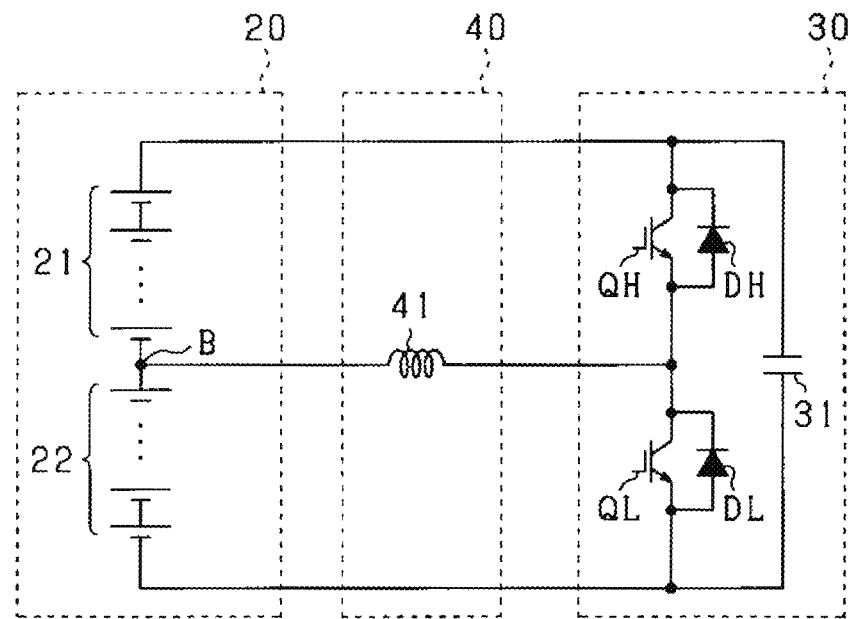
(b)
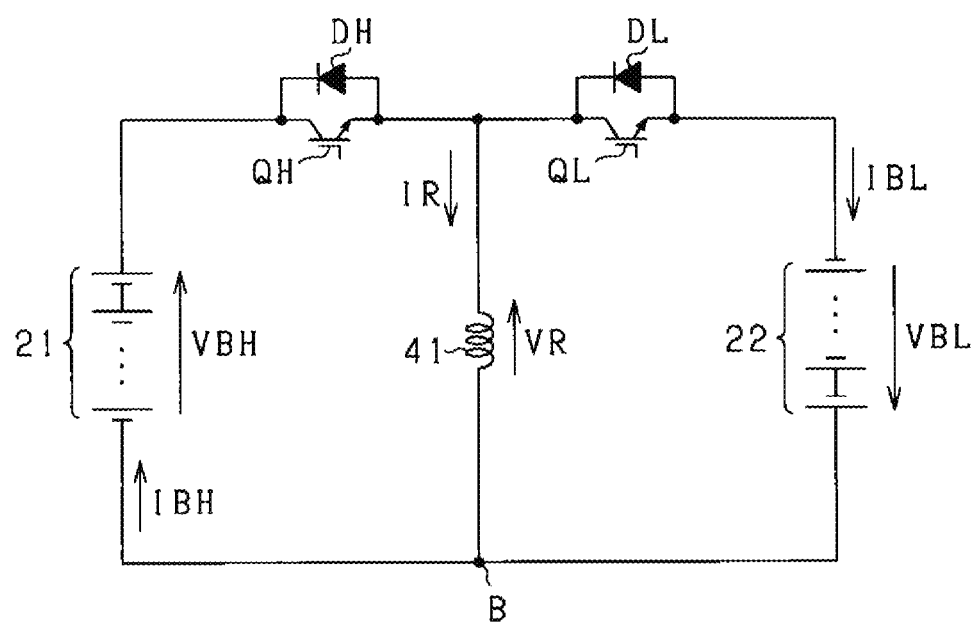

FIG.13

| CURRENT DIRECTION OF WINDING | INPUT | | OUTPUT | | |
|---|---|---|---|---|---|
| | ELECTRICAL ANGLE | U-PHASE $Iu*(n+1)$ | U-PHASE $Iu*(n+1)$ | V-PHASE $Iv*(n+1)$ | W-PHASE $Iw*(n+1)$ |
| INVERTER → NEUTRAL POINT | $0° \leq \theta e < 30°$ | $Iu*(n)$ | | $Iv*(n)+\Delta Im/3$ | $Iw*(n)-\Delta Im/3$ |
| | $30° \leq \theta e < 60°$ | $Iu*(n)-\Delta Im/3$ | | $Iv*(n)+\Delta Im/3$ | $Iw*(n)$ |
| | $60° \leq \theta e < 90°$ | $Iu*(n)+\Delta Im/3$ | | $Iv*(n)$ | $Iw*(n)-\Delta Im/3$ |
| | $90° \leq \theta e < 120°$ | $Iu*(n)$ | | $Iv*(n)-\Delta Im/3$ | $Iw*(n)+\Delta Im/3$ |
| | $120° \leq \theta e < 150°$ | $Iu*(n)-\Delta Im/3$ | | $Iv*(n)$ | $Iw*(n)+\Delta Im/3$ |
| | $150° \leq \theta e < 180°$ | $Iu*(n)$ | | $Iv*(n)+\Delta Im/3$ | $Iw*(n)-\Delta Im/3$ |
| | $180° \leq \theta e < 210°$ | $Iu*(n)+\Delta Im/3$ | | $Iv*(n)-\Delta Im/3$ | $Iw*(n)$ |
| | $210° \leq \theta e < 240°$ | $Iu*(n)$ | | $Iv*(n)-\Delta Im/3$ | $Iw*(n)+\Delta Im/3$ |
| | $240° \leq \theta e < 270°$ | $Iu*(n)-\Delta Im/3$ | | $Iv*(n)+\Delta Im/3$ | $Iw*(n)$ |
| | $270° \leq \theta e < 300°$ | $Iu*(n)+\Delta Im/3$ | | $Iv*(n)$ | $Iw*(n)-\Delta Im/3$ |
| | $300° \leq \theta e < 330°$ | $Iu*(n)$ | | $Iv*(n)+\Delta Im/3$ | $Iw*(n)-\Delta Im/3$ |
| | $330° \leq \theta e < 360°$ | $Iu*(n)-\Delta Im/3$ | | $Iv*(n)$ | $Iw*(n)+\Delta Im/3$ |
| NEUTRAL POINT → INVERTER | $0° \leq \theta e < 30°$ | $Iu*(n)$ | | $Iv*(n)-\Delta Im/3$ | $Iw*(n)+\Delta Im/3$ |
| | $30° \leq \theta e < 60°$ | $Iu*(n)+\Delta Im/3$ | | $Iv*(n)-\Delta Im/3$ | $Iw*(n)$ |
| | $60° \leq \theta e < 90°$ | $Iu*(n)-\Delta Im/3$ | | $Iv*(n)$ | $Iw*(n)+\Delta Im/3$ |
| | $90° \leq \theta e < 120°$ | $Iu*(n)$ | | $Iv*(n)+\Delta Im/3$ | $Iw*(n)-\Delta Im/3$ |
| | $120° \leq \theta e < 150°$ | $Iu*(n)+\Delta Im/3$ | | $Iv*(n)$ | $Iw*(n)-\Delta Im/3$ |
| | $150° \leq \theta e < 180°$ | $Iu*(n)$ | | $Iv*(n)-\Delta Im/3$ | $Iw*(n)+\Delta Im/3$ |
| | $180° \leq \theta e < 210°$ | $Iu*(n)-\Delta Im/3$ | | $Iv*(n)+\Delta Im/3$ | $Iw*(n)$ |
| | $210° \leq \theta e < 240°$ | $Iu*(n)$ | | $Iv*(n)+\Delta Im/3$ | $Iw*(n)-\Delta Im/3$ |
| | $240° \leq \theta e < 270°$ | $Iu*(n)+\Delta Im/3$ | | $Iv*(n)-\Delta Im/3$ | $Iw*(n)$ |
| | $270° \leq \theta e < 300°$ | $Iu*(n)-\Delta Im/3$ | | $Iv*(n)$ | $Iw*(n)+\Delta Im/3$ |
| | $300° \leq \theta e < 330°$ | $Iu*(n)$ | | $Iv*(n)-\Delta Im/3$ | $Iw*(n)+\Delta Im/3$ |
| | $330° \leq \theta e < 360°$ | $Iu*(n)+\Delta Im/3$ | | $Iv*(n)$ | $Iw*(n)-\Delta Im/3$ |

(a)

BEFORE PHASE CURRENT
IMBALANCE CONTROL (b)

AFTER PHASE CURRENT
IMBALANCE CONTROL $Iv*(n+1) = Iv*(n) + \Delta Im/3$ $Iu*(n+1) = Iu*(n)$ $Iw*(n+1) = Iw*(n) - \Delta Im/3$ (a)

BEFORE PHASE CURRENT
IMBALANCE CONTROL (b)

AFTER PHASE CURRENT
IMBALANCE CONTROL $Iv*(n+1) = Iv*(n) - \Delta Im/3$ $Iu*(n+1) = Iu*(n)$ $Iw*(n+1) = Iw*(n) + \Delta Im/3$

POWER CONVERSION APPARATUS

CROSS REFERENCE TO RELATED APPLICATIONS

This application is the U.S. bypass application of International Application No. PCT/JP2022/011099 filed on Mar. 11, 2022, which designated the U.S. and claims priority to Japanese Patent Application No. 2021-066577 filed on Apr. 9, 2021, the contents of which is incorporated herein by reference.

BACKGROUND

Technical Field

The present disclosure relates to power conversion apparatus.

Description of the Related Art

There have been known power conversion apparatuses that perform temperature-increase control of a storage battery by exchanging power between the storage battery and a capacitor via an inverter. For example, temperature-increase control of a storage battery is performed by causing a current to flow between a first storage battery and a second storage battery that constitute a battery pack via an inverter, windings of a rotary electric machine, and a connection circuit. The power conversion apparatus is assumed to be mounted in a vehicle, and the rotary electric machine may be, for example, a traveling motor.

SUMMARY

According to the present disclosure, a power conversion apparatus is provided with a power converter having series connections of upper arm switches and lower arm switches and configured to convert DC power supplied from a battery into AC power by switching control, the power conversion apparatus being configured to supply the AC power from the power converter to a rotary electric machine having windings, the rotary electric machine being connected to an axle of a vehicle, the power conversion apparatus comprising: a control unit that performs temperature-increase control of the battery by performing switching control of the upper arm switches and the lower arm switches so that a current flows to the battery via the power converter and the windings, wherein, in the temperature-increase control while the vehicle is stopped, the control unit acquires a current value of the rotary electric machine flowing through a neutral point of the windings and controls the current so that the current value gradually increases within a current control range in which a torque of the rotary electric machine is less than a threshold value.

BRIEF DESCRIPTION OF THE DRAWINGS

The above and other objects, features and advantages of the present disclosure will become apparent from the following detailed description with reference to the accompanying drawings. In the accompanying drawings:

FIG. 3 is a diagram showing an equivalent circuit;
FIG. 6 is a timing diagram showing a transition of a control mode of a switch, and the like;
FIG. 13 is a diagram for explaining phase current imbalance control.

DETAILED DESCRIPTION OF THE PREFERRED EMBODIMENTS

Figure 1:
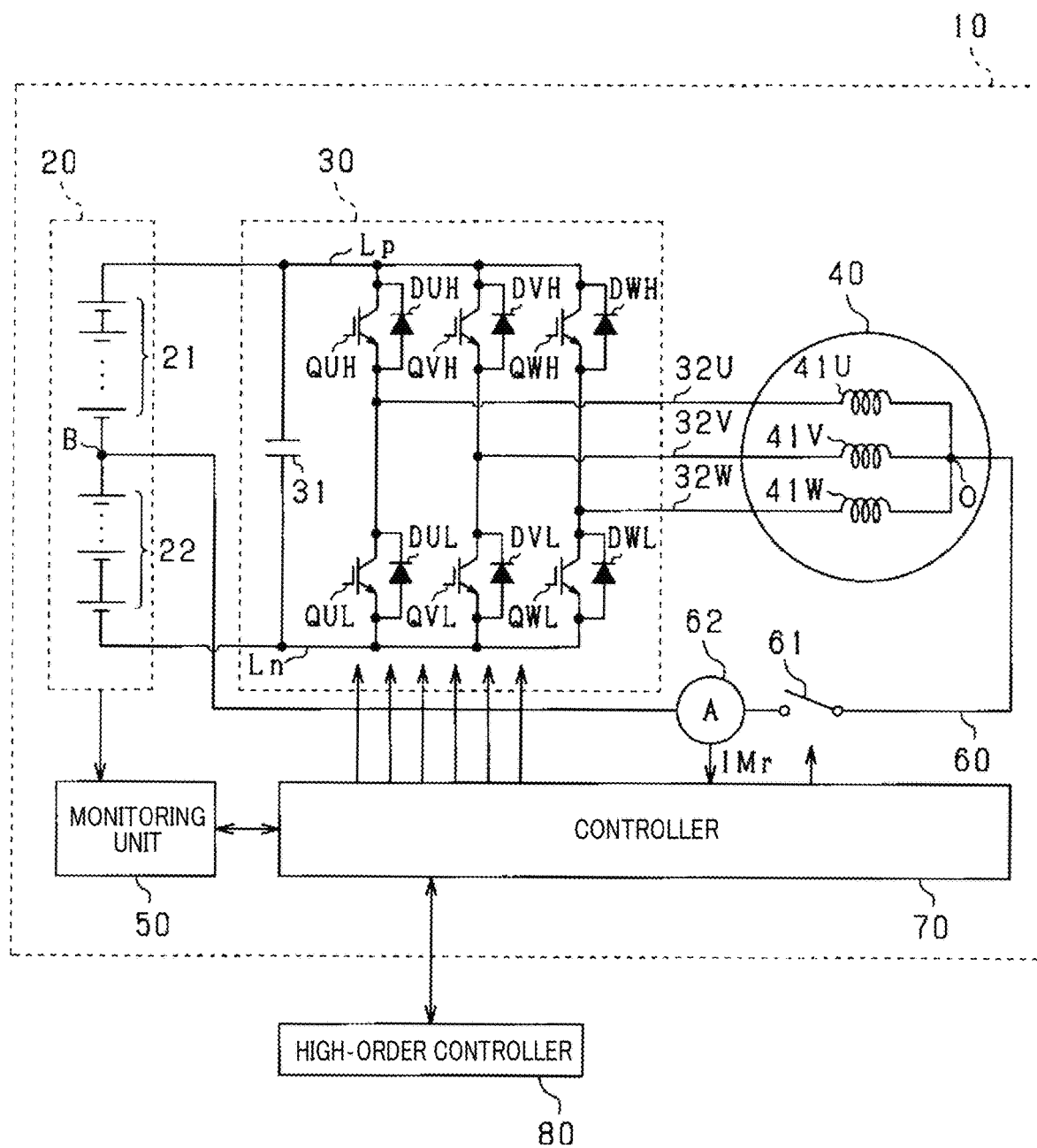
FIG. 1 is a block diagram of a power conversion apparatus.

There have been known power conversion apparatuses that perform temperature-increase control of a storage battery by exchanging power between the storage battery and a capacitor via an inverter. According to a patent literature, JP 2020-120566 A, temperature-increase control of a storage battery is performed by causing a current to flow between a first storage battery and a second storage battery that constitute a battery pack via an inverter, windings of a rotary electric machine, and a connection circuit. The power conversion apparatus is assumed to be mounted in a vehicle, and the rotary electric machine may be, for example, a traveling motor.

During temperature-increase control while a vehicle is stopped, a large current supplied to windings of a rotary electric machine generates an unintended large motor torque, and the torque may exceed a parking brake holding torque, causing the vehicle to move.

First Embodiment

With reference to the drawings, a first embodiment of a power conversion apparatus according to the present disclosure will be described below. In the present embodiment, the power conversion apparatus is mounted in a vehicle. It should be noted that the same or equivalent components in the following embodiments are denoted by the same reference signs in the drawings, and the description thereof will be omitted.

As shown in FIG. 1, a power conversion apparatus 10 includes an inverter 30 as a power converter connected to a rotary electric machine 40. The power conversion apparatus 10 has a function of exchanging electrical power between a battery pack 20 and the rotary electric machine via the inverter 30 in order to raise the temperature of the battery pack 20 as a battery.

The rotary electric machine 40 is a three-phase synchronous machine, and includes U-, V- and W-phase windings 41U, 41V and 41W that are star-connected as stator windings. The phase windings 41U, 41V and 41W are shifted from each other by an electrical angle of 120°. The rotary electric machine 40 may be, for example, a permanent magnet synchronous machine. In the present embodiment, the rotary electric machine 40 is a main onboard machine, and serves as a source of traveling power of the vehicle. That is, the rotary electric machine 40 is coupled to the axle.

The inverter 30 includes three phases of series connections of upper arm switches QUH, QVH and QWH and lower arm switches QUL, QVL and QWL. In the present embodiment, voltage-controlled semiconductor switching elements are used as the switches QUH, QVH, QWH, QUL, QVL and QWL, and specifically, IGBTs, MOSFETs, and the like are used. Diodes DUH, DVH, DWH, DUL, DVL and DWL as freewheel diodes are connected to the switches QUH, QVH, QWH, QUL, QVL and QWL, respectively, in an antiparallel manner.

A low potential terminal of the U-phase upper arm switch QUH and a high potential terminal of the U-phase lower arm switch QUL are connected to a first end of the U-phase winding 41U of the rotary electric machine 40 via a U-phase conductive member 32U such as a bus bar. A low potential terminal of the V-phase upper arm switch QVH and a high potential terminal of the V-phase lower arm switch QVL are connected to a first end of the V-phase winding 41V of the rotary electric machine 40 via a V-phase conductive member 32V such as a bus bar. A low potential terminal of the W-phase upper arm switch QWH and a high potential terminal of the W-phase lower arm switch QWL are connected to a first end of the W-phase winding 41W of the rotary electric machine 40 via a W-phase conductive member 32W such as a bus bar. Second ends of the U-, V- and W-phase windings 41U, 41V and 41W are connected to each other at a neutral point O. In the present embodiment, the phase windings 41U, 41V and 41W have the same number of turns. Accordingly, the phase windings 41U, 41V and 41W have the same inductance, for example.

The high potential terminals of the upper arm switches QUH, QVH and QWH are connected to a positive electrode terminal of the battery pack 20 via a positive electrode bus Lp such as a bus bar. The low potential terminals of the lower arm switches QUL, QVL and QWL are connected to a negative electrode terminal of the battery pack 20 via a negative electrode bus Ln such as a bus bar.

The power conversion apparatus 10 includes a capacitor (smoothing capacitor) 31 that connects the positive electrode bus Lp and the negative electrode bus Ln. The capacitor 31 may be incorporated in the inverter 30 or may be provided externally to the inverter 30.

The battery pack 20 is configured as a series connection of battery cells as unit cells, and may have a terminal voltage of several hundred volts, for example. In the present embodiment, the terminal voltages (for example, rated voltages) of the battery cells constituting the battery pack 20 are set to be the same. The battery cells may be, for example, secondary batteries such as lithium ion batteries.

In the present embodiment, among the battery cells constituting the battery pack 20, a series connection of a plurality of battery cells on the high potential side constitutes a first storage battery 21, and a series connection of a plurality of battery cells on the low potential side constitutes a second storage battery 22. That is, the battery pack 20 is divided into two blocks. In the present embodiment, the number of battery cells constituting the first storage battery 21 and the number of battery cells constituting the second storage battery 22 are the same. Accordingly, the terminal voltage (for example, rated voltage) of the first storage battery 21 and the terminal voltage (for example, rated voltage) of the second storage battery 22 are the same.

In the battery pack 20, the negative electrode terminal of the first storage battery 21 and the positive electrode terminal of the second storage battery 22 are connected to an intermediate terminal B.

The power conversion apparatus 10 includes a monitoring unit 50 (corresponding to a voltage information detecting unit). The monitoring unit 50 monitors the terminal voltage, SOC, SOH, temperature, and the like of each battery cell constituting the battery pack 20.

The power conversion apparatus 10 includes a connection path 60 and a connection switch 61. The connection path 60 electrically connects the intermediate terminal B of the battery pack 20 and the neutral point O. The connection switch 61 is provided on the connection path 60. In the present embodiment, a relay is used as the connection switch 61. When the connection switch 61 is turned on, the intermediate terminal B and the neutral point O are electrically connected to each other. On the other hand, when the connection switch 61 is turned off, the intermediate terminal B and the neutral point O are electrically isolated from each other.

The power conversion apparatus 10 includes a current sensor 62 that detects a current flowing through the connection path 60 (that is, a current flowing through the neutral point). A value detected by the current sensor 62 is input to a controller 70 (corresponding to a control unit) of the power conversion apparatus 10.

The controller 70 is mainly configured with a microcomputer, and controls switching of each switch constituting the inverter 30 in order to perform feedback control of a controlled variable of the rotary electric machine 40 to a command value thereof. Thus, the power conversion apparatus 10 converts the DC power of the battery pack 20 into AC power and supplies it to the rotary electric machine 40. The controlled variable may be, for example, torque.

The controller 70 controls on/off of the connection switch 61, and is capable of communicating with the monitoring unit 50. Further, the controller 70 is capable of communicating with a high-order controller 80 provided external to the power conversion apparatus 10. The high-order controller 80 performs overall control of the vehicle.

The controller 70 implements various control functions by executing programs stored in its own storage device. The various functions may be implemented by an electronic circuit which is hardware, or may be implemented by both hardware and software.

Figure 2:
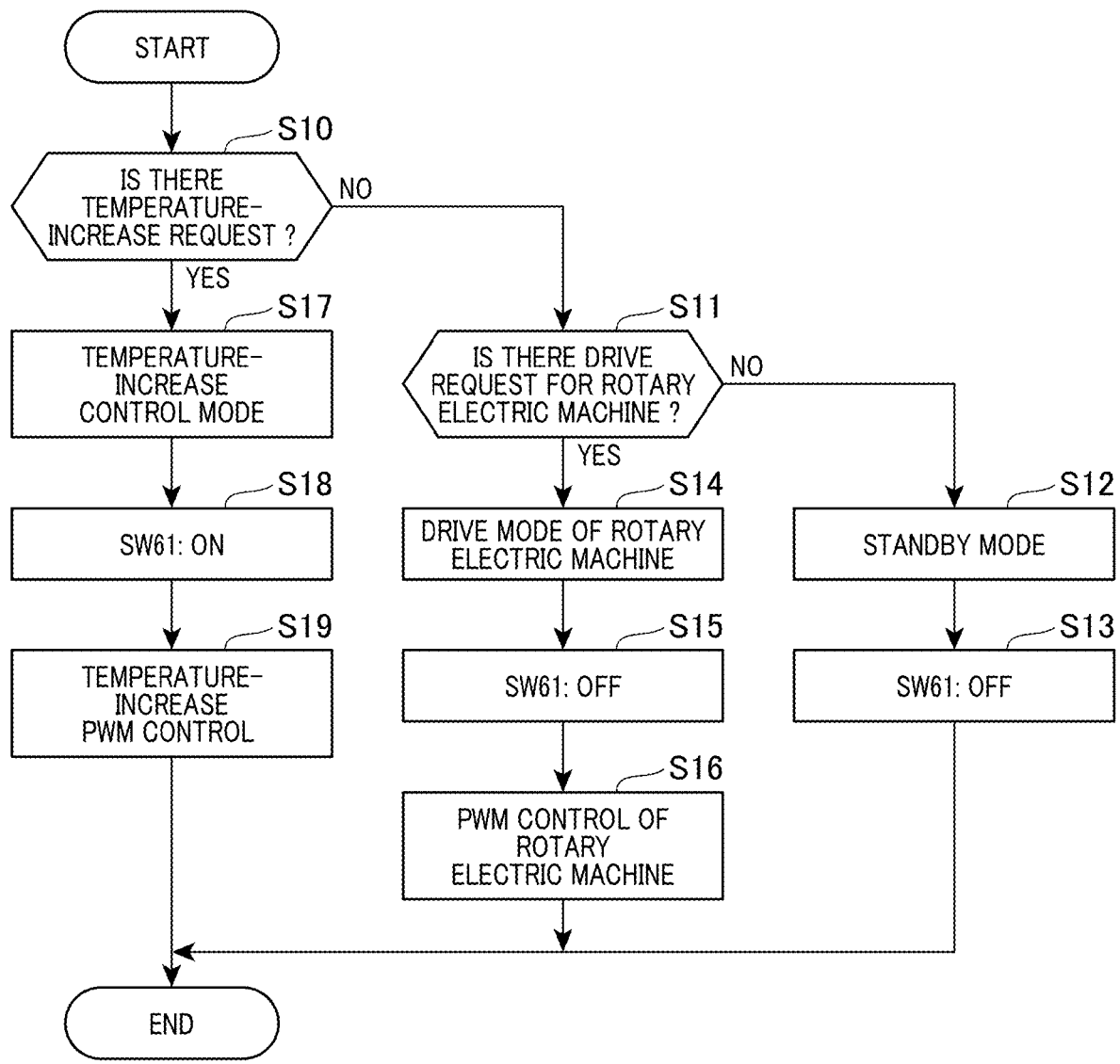
FIG. 2 is a flowchart showing temperature-increase control process.

Next, description will be given of temperature-increase control for the battery pack 20 executed by the controller 70. FIG. 2 is a flowchart showing a procedure of temperature-increase control process. This process is repeatedly executed by the controller 70 at a predetermined control cycle, for example.

In step S10, it is determined whether there is a request to raise the temperature of the battery pack 20. For example, when it is determined that there is an instruction to raise the temperature of the battery pack 20 from the high-order controller 80 or when it is determined that the temperature of the battery pack 20 detected by the monitoring unit 50 is less than a threshold temperature, it can be determined that there is a temperature-increase request. The temperature compared with the threshold temperature may be, for example, a lowest temperature among the detected temperatures of the battery cells or an average temperature of the battery cells calculated based on the detected temperatures of the battery cells. In the present embodiment, a situation affirmatively determined in step S10 is assumed to be a situation in which the vehicle is stopped before the rotary electric machine 40 is driven.

If it is determined that there is no temperature-increase request in step S10, the process proceeds to step S11, and it is determined whether there is a request to drive the rotary electric machine 40. In the present embodiment, the drive request includes a request to make the vehicle travel by rotational driving of the rotary electric machine 40.

If it is determined that there is no drive request in step S11, the process proceeds to step S12, and a standby mode is set. By setting this mode, the switches QUH to QWL of the inverter 30 are controlled to be turned off. In step 513, the connection switch 61 is controlled to be turned off. Thus, the intermediate terminal B and the neutral point O are electrically isolated from each other.

If it is determined that there is a drive request in step S11, the process proceeds to step S14, and a drive mode of the rotary electric machine 40 is set. In step S16, the connection switch 61 is controlled to be turned on. Thus, the intermediate terminal B and the neutral point O are electrically connected to each other via the connection path 60. Then, in step S16, switching of the switches QUH to QWL of the inverter 30 is controlled to rotationally drive the rotary electric machine 40. Thus, the drive wheels of the vehicle can rotate to make the vehicle travel. The switching control in step S16 may be performed, for example, using PWM based on a comparison of magnitude between a command voltage applied to the phase windings 41U to 41W and a career signal (for example, a triangular wave signal), or a pulse pattern.

If it is determined that there is a temperature-increase request in step S10, the process proceeds to step S17, and a temperature-increase control mode is set. In step S18, the connection switch 61 is controlled to be turned on. In step S19, temperature-increase PWM control is performed to raise the temperature of the battery pack 20. This control will be described below.

In FIG. 3, chart (a) shows an equivalent circuit of the power conversion apparatus 10 used in temperature-increase PWM control. In chart (a) in FIG. 3, the phase windings 41U to 41W are indicated as a winding 41, the upper arm switches QUH, QVH and QWH are indicated as an upper arm switch QH, and the upper arm diodes DUH, DVH and DWH are indicated as an upper arm diode DH. Further, the lower arm switches QUL, QVL and QWL are indicated as a lower arm switch QL, and the lower arm diodes DUL, DVL and DWL are indicated as a lower arm diode DL.

The equivalent circuit of chart (a) in FIG. 3 can be shown as an equivalent circuit of a chart (b) of FIG. 3. The circuit of the chart (b) is a buck-boost chopper circuit capable of bidirectional power transmission between the first storage battery 21 and the second storage battery 22. In the chart (b), VBH indicates the terminal voltage of the first storage battery 21, IBH indicates the current flowing through the first storage battery 21, VBL indicates the terminal voltage of the second storage battery 22, and IBL indicates the current flowing through the second storage battery 22. IBH and IBL become negative when the charging current of the first and second storage batteries 21 and 22 flows, and positive when the discharging current of the first and second storage batteries 21 and 22 flows. Further, VR indicates the terminal voltage of the winding 41, and IR indicates the current flowing through the neutral point O (corresponding to a current value of the rotary electric machine). IR becomes negative when the current flows through the neutral point O in the positive direction from the winding 41 to the intermediate terminal B, and positive when the current flows through the neutral point O in the opposite direction.

With reference to FIG. 3, chart (b), when the upper arm switch QH is turned on, the terminal voltage VR of the winding 41 becomes "VBH." On the other hand, when the lower arm switch QL is turned on, the terminal voltage VR of the winding 41 becomes "–VBL." That is, when the upper arm switch QH is turned on, an excitation current can flow through the winding 41 in the positive direction, and when the lower arm switch QL is turned on, an excitation current can flow through the winding 41 in the negative direction.

Figure 4:
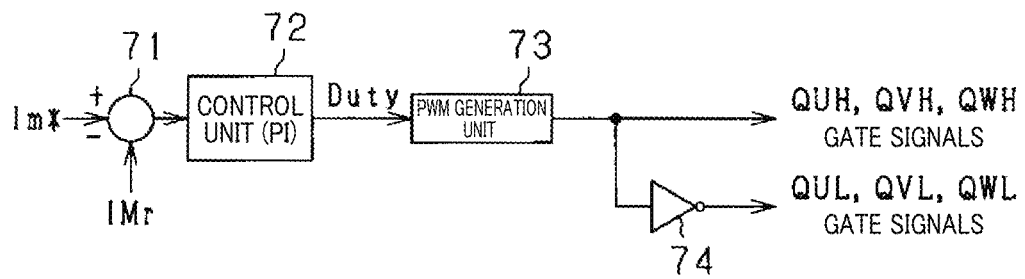
FIG. 4 is a functional block diagram of a controller.
Figure 5:
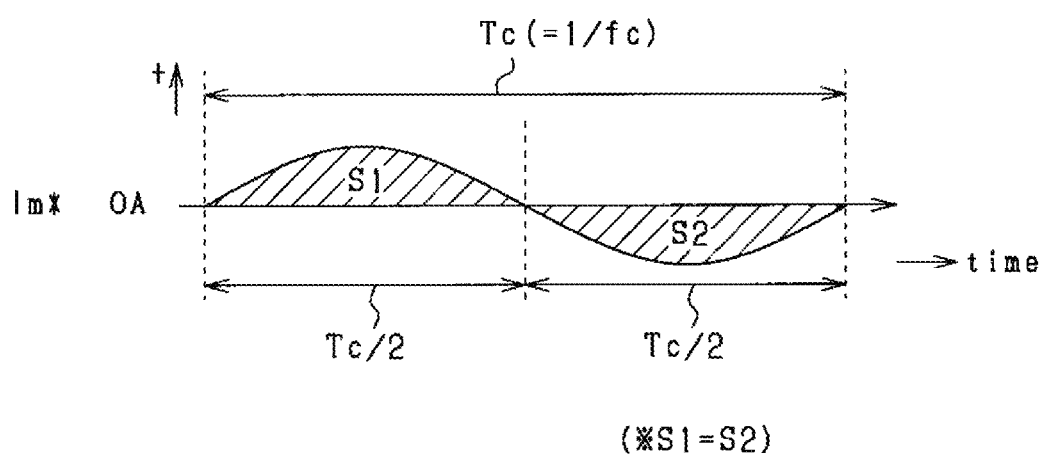
FIG. 5 is a diagram showing a method of setting a command current.

FIG. 4 is a block diagram of temperature-increase PWM control. In the controller 70, a current deviation calculation unit 71 calculates a current deviation by subtracting a current (hereinafter, referred to as a detected current IMr) detected by the current sensor 62 from a command current Im*. In the present embodiment, the command current Im* is set as a sinusoidal wave as shown in FIG. 5. Specifically, the command current Im* is set so that a positive command current Im* and a negative command current Im* are point-symmetrical to a zero-crossing timing of the command current Im* in each cycle Tc of the command current Im*. Thus, a period from a zero-up crossing timing to a zero-down crossing timing of the command current Im* and a period from a zero-down crossing timing to a zero-up crossing timing of the command current Im* becomes equal to each other.

Further, in each cycle Tc of the command current Im*, an area S1 of a first region and an area S2 of a second region becomes equal to each other. The first region S1 is a region surrounded by the time axis from the zero-up crossing timing to the zero-down crossing timing of the command current Im* and the positive command current Im* in each cycle Tc of the command current Im*. The second region is a region surrounded by the time axis from the zero-down crossing timing to the zero-up crossing timing of the command current Im* and the negative command current Im* in each cycle Tc. By setting "S1=S2", it is possible to balance the charging and discharging currents of the first storage battery 21 and the second storage battery 22 in each cycle Tc, suppressing an increase in the difference between the terminal voltage of the first storage battery 21 and the terminal voltage of the second storage battery 22 due to the temperature-increase control.

In addition, a frequency fc of the command current Im*, which is the reciprocal of a single cycle Tc of the command current Im*, may be preferably set to, for example, a frequency on the lower limit side of the human audible range. Specifically, the frequency fc is preferably set to 1 kHz or less, which is a frequency range in which the A-weighting correction value (dB) becomes or less, and more preferably set to a frequency between 30 Hz and 100 Hz (e.g., 50 Hz).

A feedback control unit 72 calculates a duty ratio Duty as a manipulated variable for performing feedback control of the calculated current deviation to 0. The duty ratio Duty is a value that determines the ratio (Ton/Tsw) of the on-time Ton in a single switching cycle Tsw of each of the switches QUH to QWL. The feedback control used by the feedback control unit 72 may be, for example, proportional-integral control.

A PWM generation unit 73 generates gate signals of the upper arm switches QUH, QVH and QWH based on the calculated duty ratio Duty. The gate signal is a signal for instructing on-control or off-control. In the present embodiment, the gate signals of the upper arm switches QUH, QVH and QWH are synchronized.

An inverter 74 generates gate signals of the lower arm switches QUL, QVL and QWL by inverting the logic of the gate signals of the upper arm switches QUH, QVH and QWH generated by the PWM generation unit 73. In the present embodiment, the gate signals of the lower arm switches QUL, QVL and QWL are synchronized.

Figure 6:
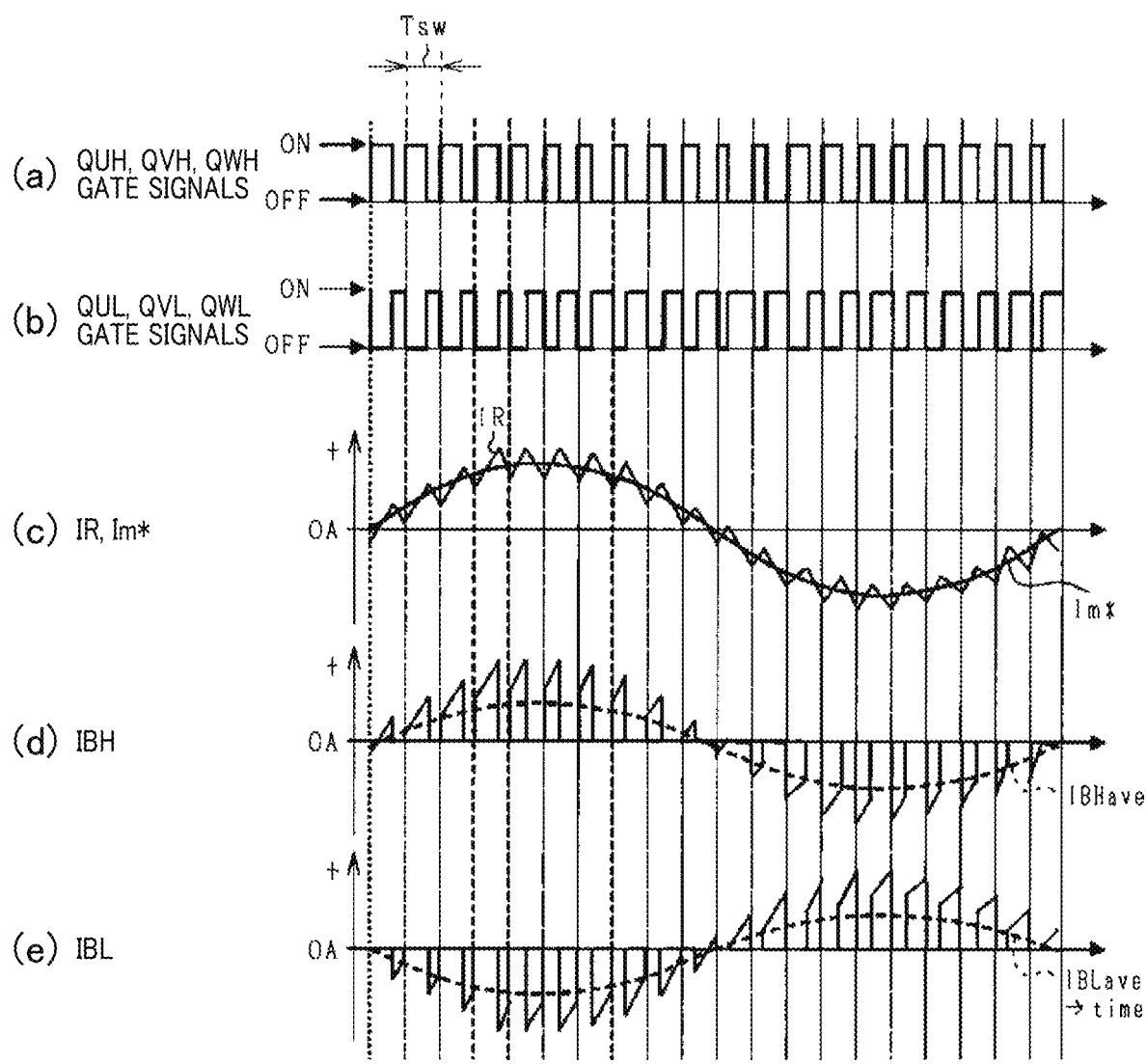

FIG. 6 shows the transition of switching patterns and the like during temperature-increase PWM control. The chart (a) in FIG. 6 shows the transition of the gate signals of the upper arm switches QUH, QVH and QWH, and the chart (b) shows the transition of the gate signals of the lower arm switches QUL, QVL and QWL. The chart (c) shows the transition of a current IR flowing through the neutral point O and the transition of the command current Im*. The chart (d) shows the transition of a current IBH flowing through the first storage battery 21, and the chart (e) shows the transition of a current IBL flowing through the second storage battery 22.

As shown in FIGS. 6, charts (a) and 6(b), temperature-increase PWM control is performed in which the upper arm switches QUH, QVH and QWH and the lower arm switches QUL, QVL and QWL are controlled to be alternately turned on. This control is continued until there is no longer temperature-increase request in step S10 of FIG. 2. By this control, a pulsed current flows through the first storage battery 21 and the second storage battery 22 as shown in chart (d) and chart (e). During a period in which the command current Im* is positive, the first storage battery 21 is discharged and the second storage battery 22 is charged. On the other hand, during a period in which the command current Im* is negative, the second storage battery 22 is discharged and the first storage battery 21 is charged. Average values IBHave and IBLave of the pulsed currents are sinusoidal currents including a component of the same frequency as the frequency of the command current Im*.

Figure 7:
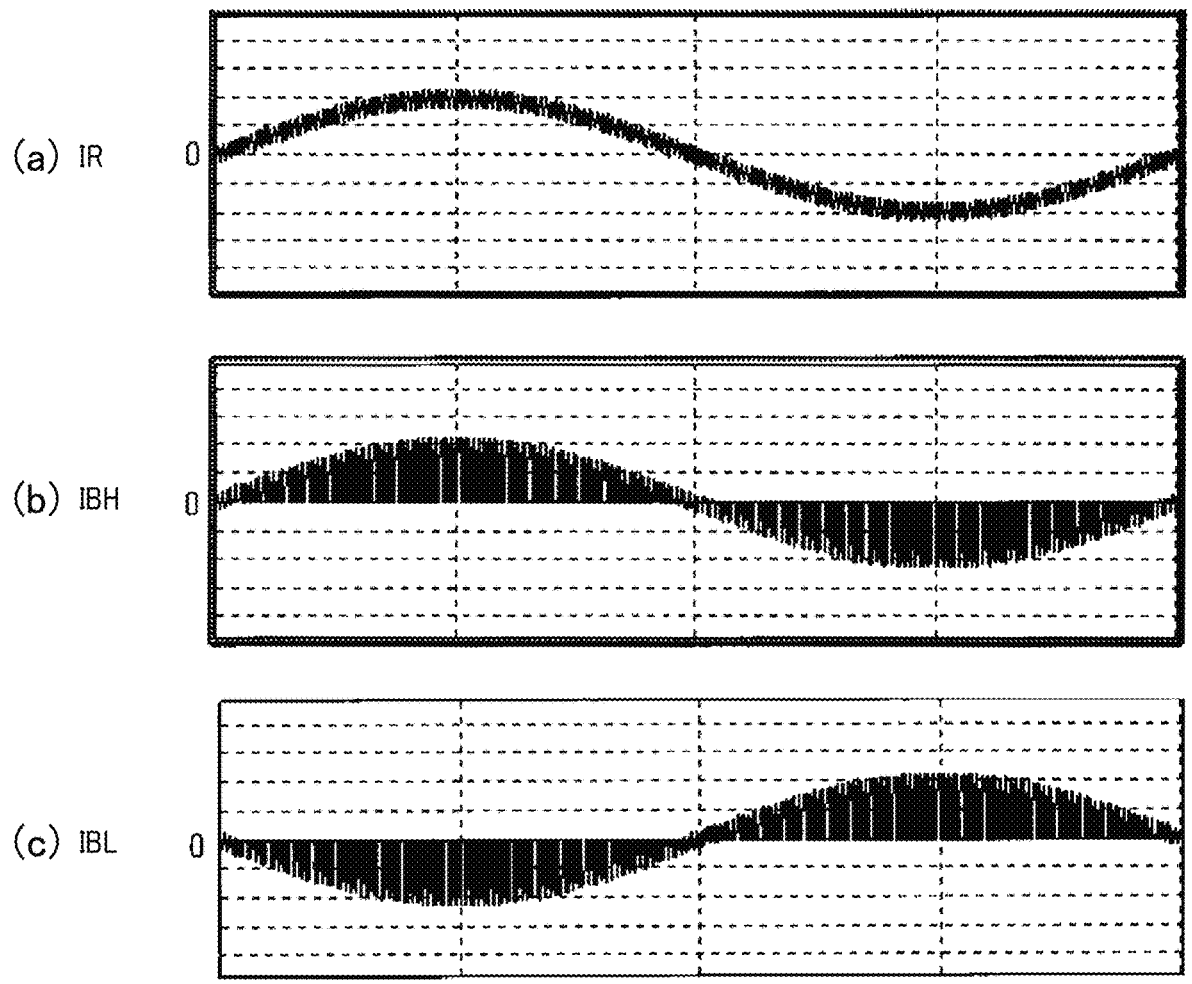
FIG. 7 is a diagram showing a simulation result.

FIG. 7 shows the simulation results of the present embodiment. In FIG. 7, charts (a) to (c) correspond to the charts (c) to (e) in FIG. 6, respectively. Thus, a sinusoidal current flows through the first storage battery 21 and the second storage battery 22, increasing the temperature. The terminal voltage of the capacitor 31 does not change.

By synchronizing the switching control, rotational driving of a rotor of the rotary electric machine 40 is suppressed. However, depending on the rotor position or the like, the rotor may be rotationally driven. In the present embodiment, it is assumed that the temperature-increase control is performed while the vehicle is stopped, so if a large current is suddenly supplied to the rotary electric machine 40, the rotor is rotationally driven, whereby the rotary electric machine 40 may output an unintended torque greater than or equal to a predetermined value, and the torque may exceed a parking brake holding torque, causing the vehicle to move.

Figure 8:
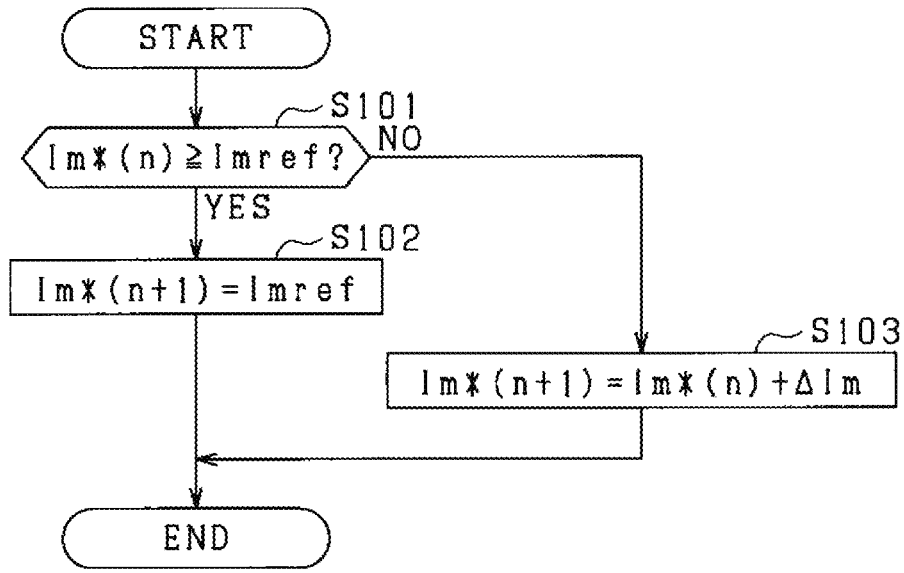
FIG. 8 is a flowchart showing a command current setting process.

Therefore, in the present embodiment, the command current Im* is set as described below in order to control the magnitude of the current IR flowing through the neutral point O. When starting the temperature-increase control, the controller 70 performs a command current setting process for determining the command current Im* shown in FIG. 8. The command current setting process is performed at a predetermined cycle during the temperature-increase control.

When starting the command current setting process, the controller 70 determines whether command current Im*(n) ≥target value Imref (step S101). The command current Im*(n) is the command current Im* in the current process, and "n" indicates the number of executions of the command current setting process. In the present embodiment, the command current Im*(0), which is the initial value of the command current Im*(n), is zero. The initial value may be arbitrarily changed as long as it is sufficiently smaller than the target value Imref. Further, the target value Imref is an amplitude command value of the current IR desirable for raising the temperatures of the first storage battery 21 and the second storage battery 22, and is set within a current control range in which the torque of the rotary electric machine 40 is less than the upper limit torque. In the present embodiment, the target value Imref corresponds to the upper limit value of the current control range. The upper limit torque is a torque that is set based on the parking brake holding torque capable of maintaining the vehicle in a stopped state, and is set to a value less than or equal to the parking brake holding torque.

If the determination result in step S101 is affirmative, the controller 70 sets the target value Imref as the command current Im*(n+1) of the next process (step S102). After the process of step S102, the controller 70 ends the command current setting process.

On the other hand, if the determination result in step S101 is negative, the controller 70 sets a value obtained by adding an amplitude increase amount ΔIm to the current command current Im*(n) as the command current Im*(n+1) of the next process (step S103). Here, the amplitude increase amount ΔIm refers to an amplitude increase amount per unit time (time change rate, increase rate), and is set at least to a value less than the upper limit torque. Preferably, the amplitude increase amount ΔIm is set so that the command current Im* reaches the target value Imref in a plurality of processes (for example, approximately 5 to 10 times) for preventing the rate of raising temperature from becoming too slow. After the process of step S103, the controller 70 ends the command current setting process.

Figure 9:
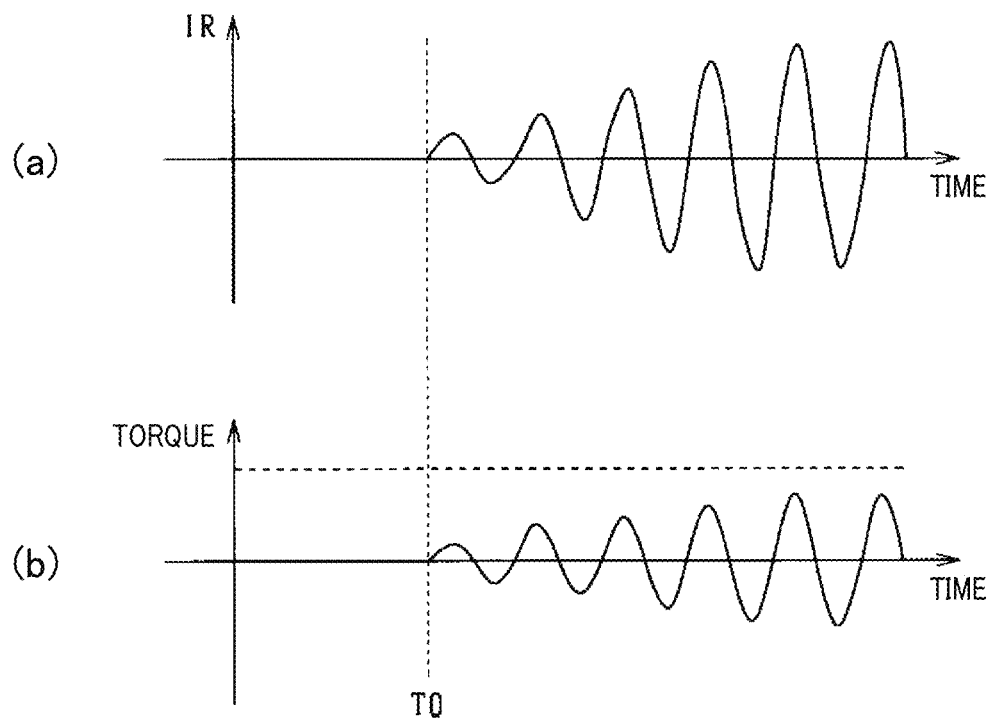
FIG. 9 is a timing diagram showing a transition of a current flowing through a neutral point and a torque.

Thus, as shown in the chart (a) of FIG. 9, the (amplitude of) current IR flowing through the neutral point O gradually increases from a temperature-increase control start time T0 within the current control range determined by the upper limit torque. Accordingly, as shown in the chart (b) of FIG. 9, the torque of the rotary electric machine 40 also gradually increases but does not exceed the upper limit torque (indicated by the dotted line). That is, the torque can be prevented from exceeding the parking brake holding torque.

According to the present embodiment detailed above, the following effects can be achieved.

When starting temperature-increase control while the vehicle is stopped, the controller controls the current so that the current IR gradually increases within a current control range in which a torque of the rotary electric machine 40 is less than an upper limit torque. Thus, when the temperature-increase control is performed while the vehicle is stopped, a large current does not suddenly flow through the winding 41 of the rotary electric machine 40, preventing generation of an unintended large torque. Therefore, it is possible to prevent the torque from exceeding the parking brake holding torque, and prevent the vehicle from moving.

The intermediate terminal B (corresponding to an intermediate point) and the neutral point are connected to each other via the connection path 60 without the switches QUIET to QWL of the inverter 30. With this configuration, the controller 70 performs switching control of the inverter so that a ripple current flows between the first storage battery 21 and the second storage battery 22 via the inverter 30, phase windings 41U, 41V and 41W and the connection path 60. This makes it possible to reduce the amount of fluctuation in the terminal voltage of the capacitor 31 without increasing the frequency fc (=1/Tc) of the reactive power (ripple current). Therefore, noise generated during temperature-increase control of the battery pack 20 can be reduced.

Further, since the amount of fluctuation in the terminal voltage of the capacitor 31 can be reduced, the capacitance of the capacitor 31 can be reduced, and the capacitor 31 can be miniaturized.

In the temperature-increase control, the controller 70 synchronizes the switching control of the upper arm switches QUH, QVH and QWH of all phases, and synchronizes the switching control of the lower arm switches QUL, QVL and QWL of all phases. Thus, each of the phase windings 41U, 41V and 41W can be regarded as an equivalent circuit in which the windings are connected in parallel. Therefore, the inductance of the winding during temperature-increase control can be reduced. Accordingly, the amount of change in the current flowing through the neutral point O in a single switching cycle Tsw can be increased, and temperature-increase control can be performed using a large current.

Further, by synchronizing the switching control, rotational driving of the rotor of the rotary electric machine 40 can be suppressed.

The controller 70 turns on the connection switch 61 when it is determined that there is a request to raise the temperature of the battery pack 20, and turns off the connection switch 61 when it is determined that there is no request to raise the temperature of the battery pack 20. Therefore, it is possible to prevent a current from flowing from the neutral point O to the intermediate terminal B when the vehicle is traveling.

Second Embodiment

Figure 10:
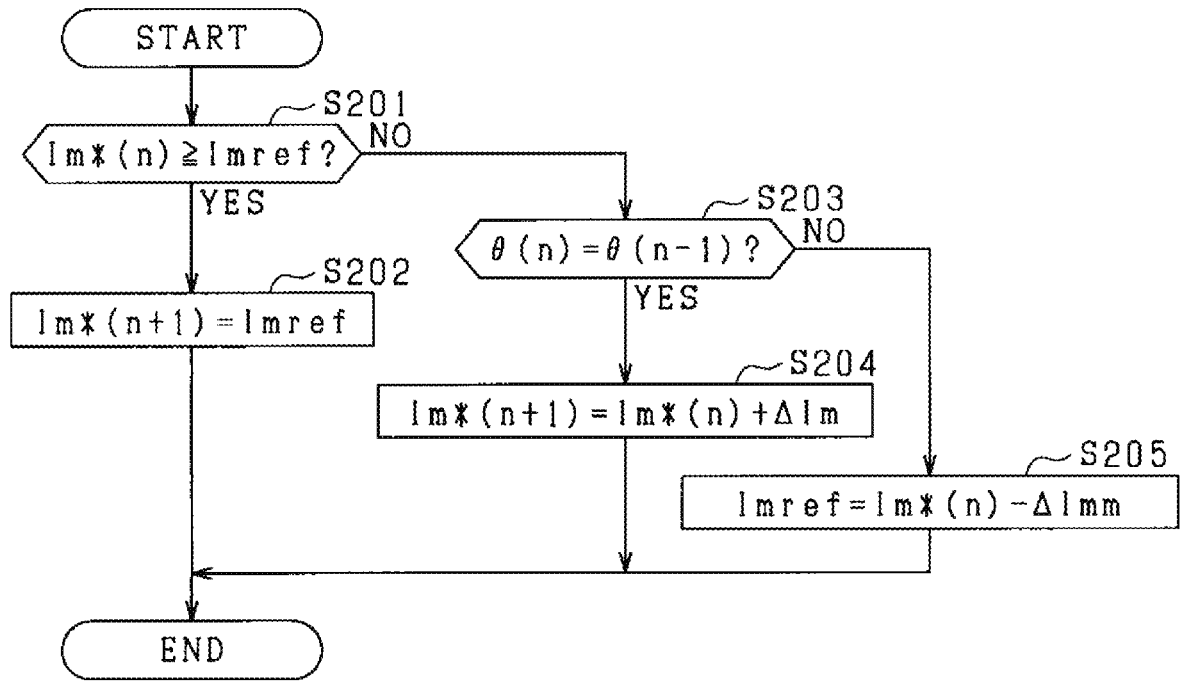
FIG. 10 is a flowchart showing a command current setting process in a second embodiment.

With reference to FIG. 10, command current setting process according to a second embodiment will be described. The second embodiment employs the basic configuration of the first embodiment, and the following description will be given focusing on configurations different from the first embodiment.

When starting the command current setting process shown in FIG. 10, the controller 70 determines whether command current Im*(n)≥target value Imref, as in step S101 (step S201). If the determination result is affirmative, the controller 70 sets the target value Imref as the command current Im*(n+1) of the next process, as in step S102 (step S202). Then, the controller 70 ends the command current setting process.

On the other hand, if the determination result in step S201 is negative, the controller 70 acquires a position θ(n) of the rotor of the rotary electric machine 40 detected by a position sensor (angle sensor, or the like) and determines whether it is the same as the previous position θ(n−1) of the rotor (step S203). That is, it is determined whether the rotor has remained stationary.

If the determination result is affirmative, that is, if the rotor has not moved, the controller 70 sets a value obtained by adding an amplitude increase amount Δim to the current command current Im*(n) as the command current Im*(n+1) of the next process, as in step S103 (step S204). Then, the controller 70 ends the command current setting process.

On the other hand, if the determination result in step S203 is negative, that is, if the rotor has moved, the controller 70 sets a value obtained by subtracting an amplitude margin ΔImm from the current command current Im*(n) as the command current Im*(n+1) of the next process (step S205). The amplitude margin ΔImm is a predetermined positive value, and is set in advance to a value at which the rotor remains stopped. The amplitude margin ΔImm may be an arbitrary value, but is preferably a value approximately half the amplitude increase amount Δim to a value equivalent to the amplitude increase amount ΔIm. As a result, a value smaller than the current command current Im*(n) by the amplitude margin ΔImm is set as the command current Im*(n+1) of the next and subsequent processes.

Figure 11:
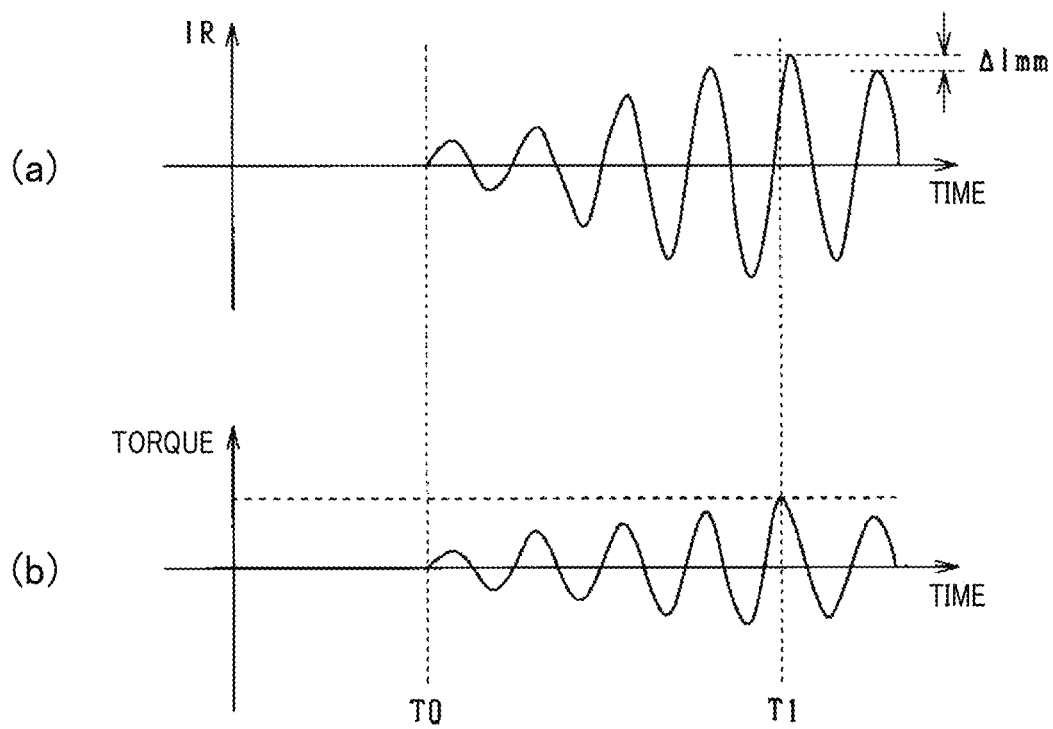
FIG. 11 is a timing diagram showing a transition of a current flowing through a neutral point and a torque in the second embodiment.

Thus, as shown in the chart (a) of FIG. 11, the (amplitude of) current IR flowing through the neutral point O gradually increases from a temperature-increase control start time T0. Accordingly, as shown in the chart (b) of FIG. 11, the torque of the rotary electric machine 40 also gradually increases from the time T0.

Then, at a time T1 when the rotor has moved, the amplitude of the current IR decreases by the amplitude margin ΔImm, and this state is maintained. Accordingly, the torque of the rotary electric machine 40 decreases at the time T1 when the upper limit torque is reached, and this state is maintained.

According to the present embodiment detailed above, the following effects can be achieved.

When the rotor has moved, the controller 70 determines that the upper limit torque has been reached, and sets a value smaller than the current command current Im*(n) by the amplitude margin ΔImm as the command current Im*(n+1) of the next and subsequent processes so that the rotor does not move further. Thus, the vehicle can be prevented from moving, and the command current Im* can be increased as close to the upper limit torque as possible. This makes it possible to quickly raise the temperature.

As described above, the amplitude increase amount Δim is preferably set to a value as large as possible so that the rate of raising temperature does not become too slow. However, if it is too large, the torque may greatly exceed the upper limit torque, causing the vehicle to move. Therefore, when the rotor has moved, the controller 70 sets a value smaller than the current command current Im*(n) by the amplitude margin ΔImm as the command current Im*(n+1) of the next and subsequent processes. Thus, it is possible to set the amplitude increase amount Δim to a value as large as possible to enable early temperature-increase while preventing the vehicle from moving forward.

Third Embodiment

Figure 12:
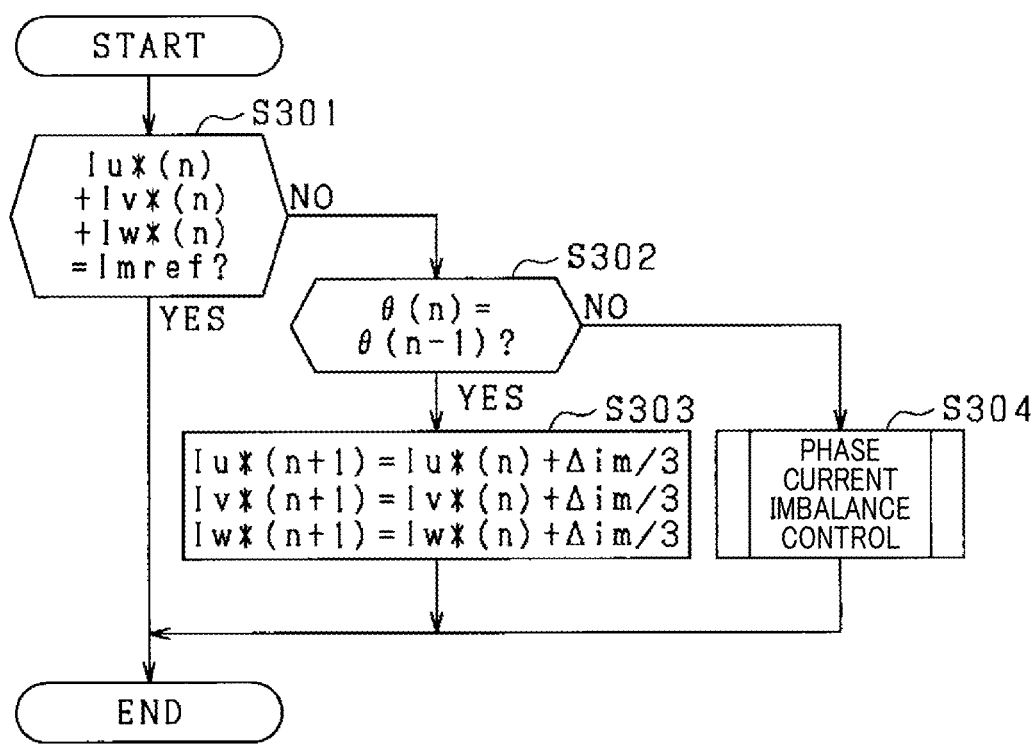
FIG. 12 is a flowchart showing a command current setting process in a third embodiment.

With reference to FIG. 12, command current setting process according to a third embodiment will be described. The third embodiment employs the basic configuration of the first embodiment, and the following description will be given focusing on configurations different from the first embodiment.

In the third embodiment, the controller 70 is configured to be able to control the phase currents of the windings 41 of the respective phases of the rotary electric machine 40. That is, in the power conversion apparatus 10, the phase currents of the windings 41 of the respective phases of the rotary electric machine 40 (corresponding to a current value of the rotary electric machine in the third embodiment) are detected, and the detected values are compared with the command values of the phase currents to control the phase currents of the windings 41 of the respective phases of the rotary electric machine 40.

When starting the command current setting process shown in FIG. 12, the controller 70 acquires command currents Iu*(n), Iv*(n) and Iw*(n) that command the amplitudes of the phase currents of the windings 41 of the respective phases (step S301). The command current Iu*(n) commands the amplitude of the phase current of the U-phase in the current process. The command current Iv*(n) commands the amplitude of the phase current of the V-phase in the current process. The command current Iw*(n) commands the amplitude of the phase current of the W-phase in the current process. Then, the controller 70 determines whether the command current Iu*(n)+Iv*(n)+Iw*(n)≥target value Imref (step S301). That is, it is determined whether the sum of the command currents Iu*(n), Iv*(n) and Iw*(n) is greater than or equal to the target value Imref.

If the determination result is affirmative, the controller 70 ends the command current setting process shown in FIG. 12. Then, the current command currents Iu*(n), Iv*(n) and Iw*(n) are used as the command currents Iu*(n+1), Iv*(n+1) and Iw*(n+1) of the next process.

On the other hand, if the determination result in step S301 is negative, the controller 70 acquires a position θ(n) of the rotor of the rotary electric machine 40 detected by a position sensor and determines whether it is the same as the previous position θ(n−1) of the rotor (step S302). That is, it is determined whether the rotor has not moved.

If the determination result in step S302 is affirmative, that is, if the rotor has not moved, the controller 70 sets values obtained by adding an amplitude increase amount ΔIm/3 to each of the command currents Iu*(n), Iv*(n) and Iw*(n) as the command currents Iu*(n+1), Iv*(n+1) and Iw*(n+1) of the next process (step S303). The amplitude increase amount ΔIm/3 is one-third of the amplitude increase amount Δim described in the first embodiment.

On the other hand, if the determination result in step S303 is negative, that is, if the rotor has moved, the controller 70 performs phase current imbalance control to determine the command currents Iu*(n+1), Iv*(n+1) and Iw*(n+1) of the next process (step S304).

Figure 14:
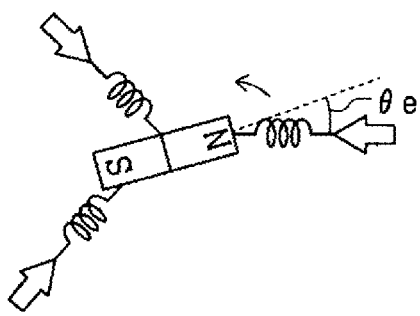
FIG. 14 is a diagram schematically showing windings of respective phases and magnetic poles.
Figure 15:
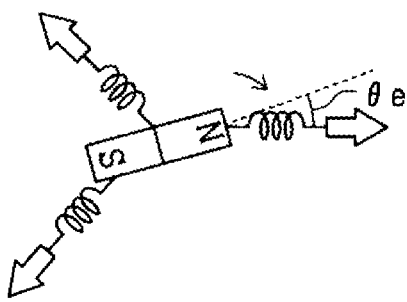
FIG. 15 is a diagram schematically showing windings of respective phases and magnetic poles.

With reference to FIG. 13, the phase current imbalance control will be described. As shown in FIG. 13, the controller 70 determines the command currents Iu*(n+1), Iv*(n+1) and Iw*(n+1) of the next process based on the direction of the phase current of the windings 41 of the respective phases and a rotor position θe. The direction of the phase current refers to each of the cases where the phase current flows from the inverter 30 to the neutral point O as shown in FIG. 14 and where the phase current flows from the neutral point O to the inverter 30 as shown in FIG. 15. Further, as shown in FIG. 14, the rotor position θe refers to the position of a magnetic pole 90 (for example, N pole) of the rotor expressed in electrical angle with the position of the U-phase winding 41U taken as 0° (reference). This is merely an example, and the reference may be the position of any winding 41, and the magnetic pole may be S pole.

For example, when the rotor position θe is 20° (0°≤θe<30°) and the phase current flows from the inverter 30 to the neutral point O (inverter→neutral point), the current command current Iu*(n) is set as the next command current Iu*(n+1). Similarly, when the rotor position θe is 20° and the phase current flows from the inverter 30 to the neutral point O, a value obtained by adding the amplitude increase amount ΔIm/3 to the current command current Iv*(n) is set as the next command current Iv*(n+1). Similarly, when the rotor position θe is 20° and the phase current flows from the inverter 30 to the neutral point O, a value obtained by subtracting the amplitude increase amount ΔIm/3 from the current command current Iw*(n) is set as the next command current Iw*(n+1).

As a result, as shown in the diagram (b) of FIG. 14, the magnitudes of the amplitudes of the phase currents become unbalanced between phases in the next and subsequent processes, and the torque of the rotary electric machine 40 decreases. The diagram (b) of FIG. 15 shows that the phase currents are unbalanced between phases when the rotor position θe is 20° (0°≤θe<30°) and the phase current flows from the neutral point O to inverter 30 (neutral point→inverter).

Figure 16:
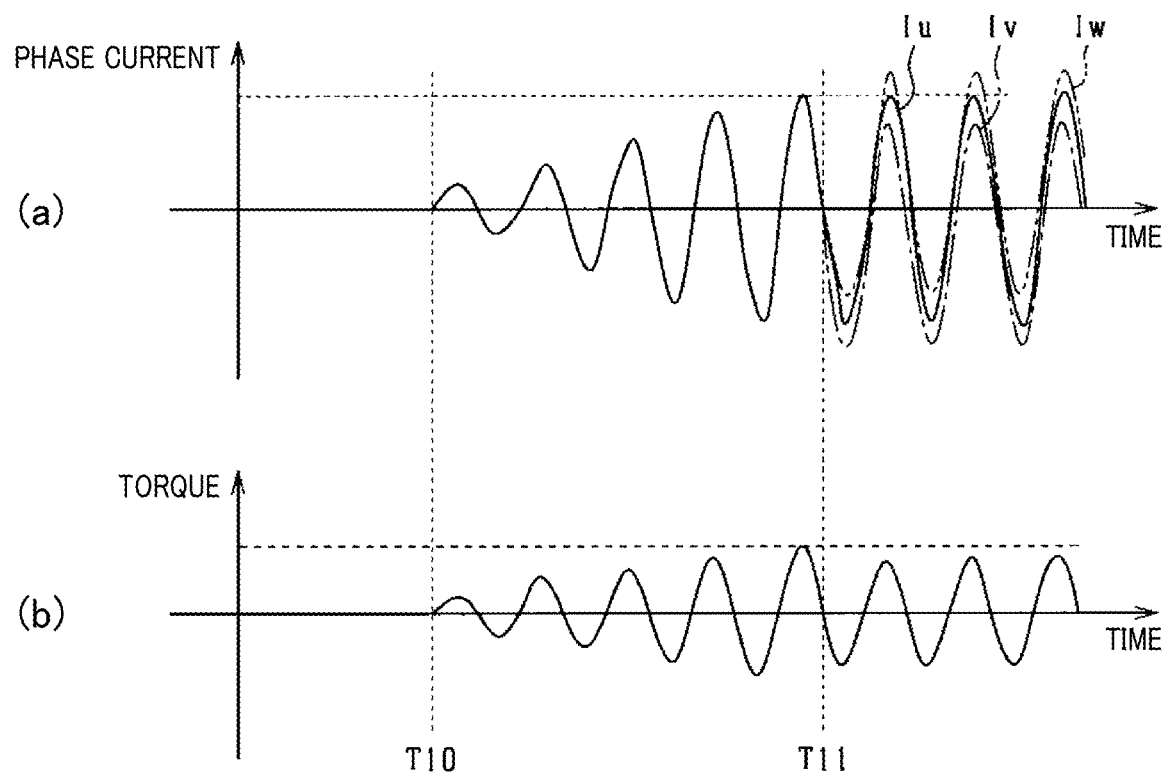
FIG. 16 is a timing diagram showing a transition of a phase current and a torque in the third embodiment.

As shown in the chart (a) of FIG. 16, by the command current setting process in the third embodiment, the (amplitude) of the phase current gradually increases from the control start time T10. Accordingly, as shown in the chart (b) of FIG. 16, the torque of the rotary electric machine also gradually increases from the time T10.

Then, at the time T11 when the rotor has moved, the phase currents Iu, Iv and Iw are controlled to be unbalanced, and this state is maintained. Accordingly, the torque of the rotary electric machine 40 decreases at the time T11 when the upper limit torque is reached, and this state is maintained. In FIG. 16, the phase current Iu is indicated by the solid line, the phase current Iv is indicated by the dot-dash line, and the phase current Iw is indicated by the dot-dot-dash line.

According to the present embodiment detailed above, the following effects can be achieved.

When the rotor has moved, the controller 70 determines that the upper limit torque has been exceeded, and controls the magnitudes of the amplitudes of the phase currents of the windings 41 of the respective phases to be unbalanced so that the rotor does not move further. Specifically, the controller 70 acquires the rotor position θe and determines, based on the direction of the phase current of the windings 41 and the rotor position θe, the command currents Iu*(n+1), Iv*(n+1) and Iw*(n+1) of the next and subsequent processes whereby the phase currents of the windings 41 become unbalanced between phases. For example, based on the direction of the phase current and the rotor position θe, it is determined which of the three phases is increased in amplitude, which of the three phases is decreased in amplitude, and which of the three phases is maintained in amplitude. Then, the increase amount ΔIm/3 is added to the winding 41 whose amplitude is to be increased, and the amplitude increase amount ΔIm/3 is subtracted from the winding 41 whose amplitude is to be reduced. As a result, the magnitudes of the phase currents become unbalanced between phases, and the torque can be reduced. Since the same value is added or subtracted as the amplitude increase amount ΔIm/3, the total value of the command currents Iu*(n), Iv*(n) and Iw*(n) can be maintained. That is, the torque can be reduced without reducing the total value. Therefore, the temperature can be raised more quickly.

Fourth Embodiment

Figure 17:
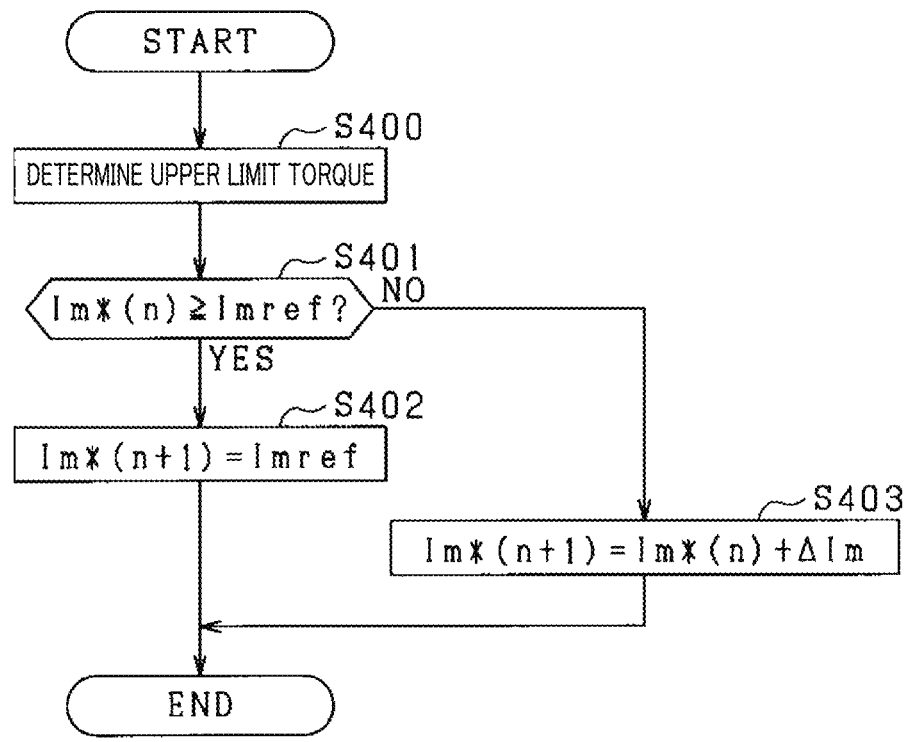
FIG. 17 is a flowchart showing a command current setting process in a fourth embodiment.

With reference to FIG. 17, command current setting process according to a fourth embodiment will be described. The fourth embodiment employs the basic configuration of the first embodiment, and the following description will be given focusing on configurations different from the first embodiment.

When starting the command current setting process shown in FIG. 17, the controller 70 acquires vehicle attitude information, and determines the upper limit torque based on the vehicle attitude information (step S400). The vehicle attitude information is information for recognizing the gradient of the road on which a vehicle is stopped based on the inclination of the vehicle. For example, when the vehicle is stopped on a downward slope, the parking brake holding torque decreases due to the influence of the weight of the vehicle, compared with the case where the vehicle is stopped on a flat ground or an upward slope. That is, even when the torque of the rotary electric machine 40 is small, the vehicle is more likely to move forward. Therefore, in step S400, the upper limit torque is determined based on the vehicle attitude information.

Specifically, the upper limit torque is reduced as the downward gradient increases. In the present embodiment, the same upper limit torque is set for the upward gradient as for the flat ground, but the upper limit torque may be increased for the upward gradient.

Then, the controller 70 determines whether command current Im*(n)≥target value Imref, as in step S101 (step S401). In the third embodiment, the current limit range may be changed depending on the upper limit torque, and the target value Imref may be changed accordingly. That is, as the upper limit torque decreases, the target value Imref may be reduced so that the torque of the rotary electric machine 40 does not exceed the upper limit torque.

If the determination result in step S401 is affirmative, the controller 70 sets the target value Imref as the command current Im*(n+1) of the next process, as in step S102 (step S402).

On the other hand, if the determination result in step S401 is negative, the controller 70 sets a value obtained by adding an amplitude increase amount Δim to the current command current Im*(n) as the command current Im*(n+1) of the next process (step S403). Here, the amplitude increase amount Δim is set at least to a value less than the upper limit torque. Preferably, the amplitude increase amount Δim is set so that the command current Im* reaches the target value Imref in a plurality of processes (for example, approximately 5 to 10 times) for preventing the rate of raising temperature from becoming too slow. Therefore, the amplitude increase amount Δim may be changed according to the target value Imref.

Figure 18:
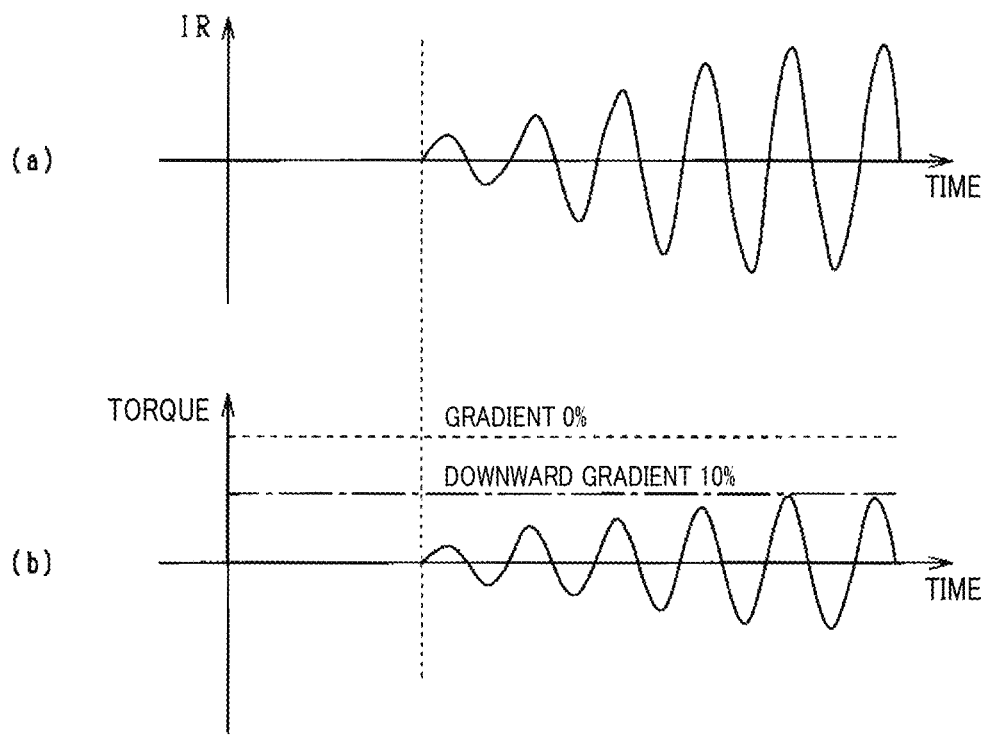
FIG. 18 is a timing diagram showing a transition of a current flowing through a neutral point and a torque in the fourth embodiment.

Thus, as shown in the chart (a) of FIG. 18, the (amplitude of) current IR flowing through the neutral point O gradually increases within the current control range. Accordingly, as shown in the chart (b) of FIG. 18, the torque of the rotary electric machine 40 also gradually increases but does not exceed the upper limit torque. In addition, when the downward gradient is large (for example, 10%) compared with the gradient of 0% (upper limit torque is indicated by the dotted line), the upper limit torque is reduced (indicated by the dot-dash line).

According to the present embodiment detailed above, the following effects can be achieved.

The controller 70 acquires vehicle attitude information while the vehicle is stopped, and changes the upper limit torque based on the vehicle attitude information. Accordingly, the controller 70 sets the target value Imref within the current limit range that does not exceed the upper limit torque. Thus, the controller 70 controls the current so that the current IR gradually increases within the current control range in which the torque of the rotary electric machine 40 is less than the upper limit torque. Therefore, when the vehicle is stopped on a downward slope, the vehicle can be prevented from moving based on the temperature-increase control.

Fifth Embodiment

Figure 19:
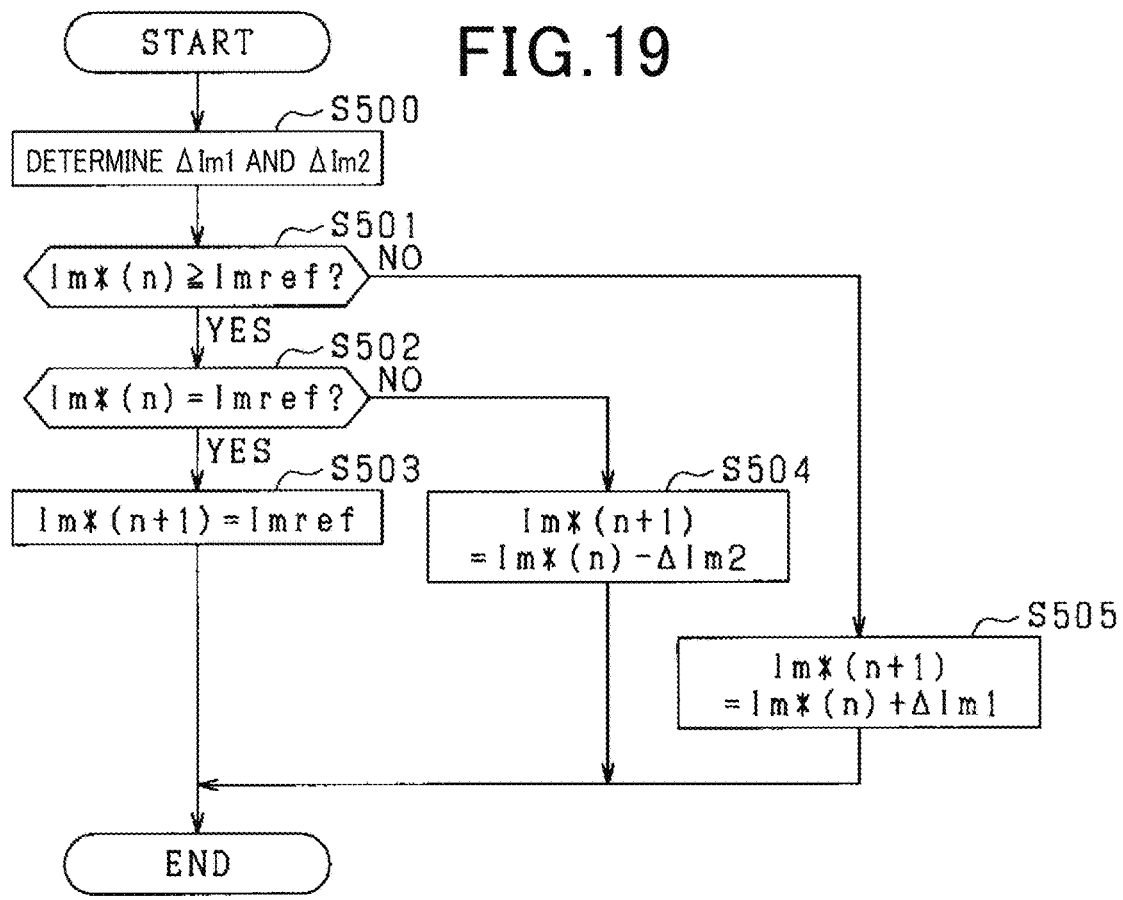
FIG. 19 is a flowchart showing command current setting process in a fifth embodiment.

With reference to FIG. 19, command current setting process according to a fifth embodiment will be described. The fifth embodiment employs the basic configuration of the first embodiment, and the following description will be given focusing on configurations different from the first embodiment.

When starting the command current setting process shown in FIG. 19, the controller 70 determines an amplitude increase amount Δim1 and an amplitude decrease amount Δim2 (step S500). Specifically, the controller 70 may determine the amplitude increase amount Δim1 according to any of the state of the battery pack 20 (battery temperature, SOC), upper limit torque, current control range, target value Imref, and the like, or a combination thereof. The amplitude increase amount Δim1 refers to an amplitude increase amount per unit time (time change rate, increase rate) as with the amplitude increase amount Δim in the first embodiment. On the other hand, the amplitude decrease amount Δim2 refers to an amplitude decrease amount per unit time (time change rate, decrease rate). In the present embodiment, the amplitude decrease amount Δim2 is set to the same value as the amplitude increase amount Δim1 (Δim1=Δim2), but may be a different value. For example, the amplitude decrease amount Δim2 may be set to a value smaller than the amplitude increase amount Δim1.

The controller 70 determines whether command current Im*(n)≥target value Imref, as in step S101 of the first embodiment (step S501).

If the determination result in step S501 is affirmative, the controller 70 determines whether command current Im*(n)=target value Imref (step S501). If the determination result in step S502 is affirmative, the controller 70 sets the target value Imref as the command current Im*(n+1) of the next process, as in step S102 (step S503). Then, the controller 70 ends the command current setting process.

On the other hand, if the determination result in step S502 is negative, the controller 70 sets a value obtained by subtracting the amplitude decrease amount Δim2 determined in step S500 from the current command current Im*(n) as the command current Im*(n+1) of the next process (step S504). Then, the controller 70 ends the command current setting process.

On the other hand, if the determination result in step S501 is negative, the controller 70 sets a value obtained by adding the amplitude increase amount Δim1 determined in step S500 to the current command current Im*(n) as the command current Im*(n+1) of the next process (step S505). Then, the controller 70 ends the command current setting process.

Figure 20:
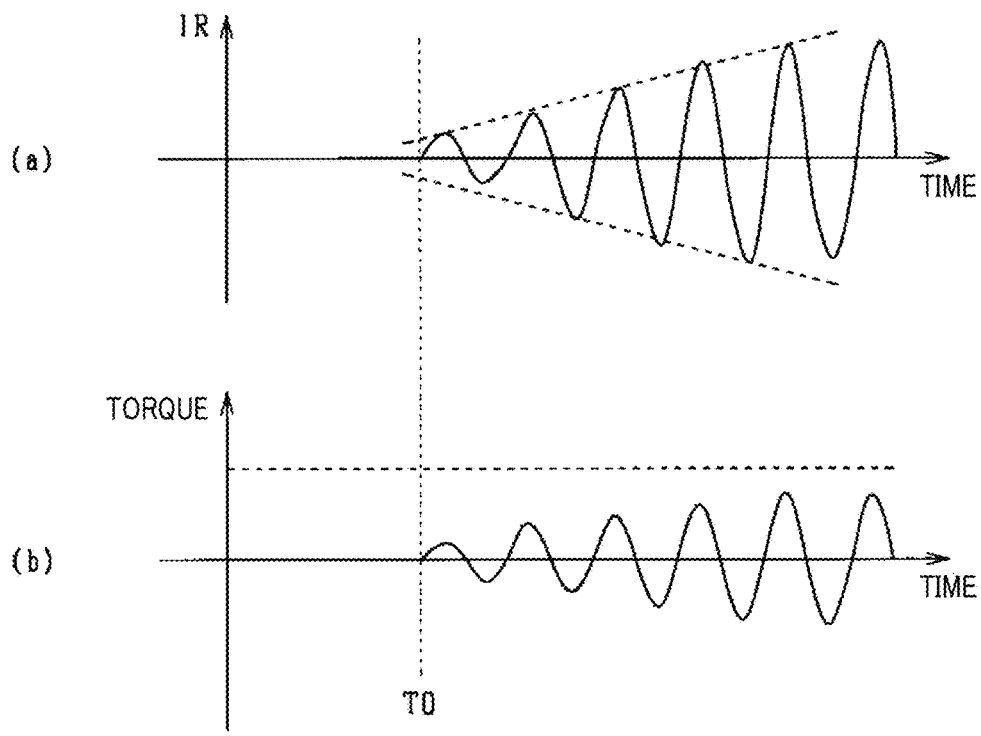
FIG. 20 is a timing diagram showing a transition of a current flowing through a neutral point and a torque in the fifth embodiment.

Thus, as shown in the chart (a) of FIG. 20, the increase rate (indicated by the dotted line) of the (amplitude of) current IR flowing through the neutral point O can be arbitrarily changed. Further, when the target value Imref is exceeded, the decrease ratio of the (amplitude of) current IR can be arbitrarily changed.

According to the present embodiment detailed above, the following effects can be achieved.

An appropriate amplitude increase amount $\Delta im1$ can be set based on the state of the battery pack 20 (battery temperature, SOC), upper limit torque, current control range, target value Imref, and the like. This makes it possible to quickly increase the current. Moreover, since an appropriate amplitude increase amount $\Delta im1$ is set, it is possible to prevent the torque from exceeding the upper limit torque of the rotary electric machine 40. Further, since the amplitude decrease amount $\Delta im2$ can be set, the command current $Im*(n+1)$ of the next and subsequent processes can be quickly set below the target value Imref if the target value Imref has been exceeded.

(Modified Examples of Above Embodiments)

A part of the configuration in the above embodiments may be modified as below. The following description will be given of modified examples.

Each of the above embodiments may be implemented in combination.

Figure 21:
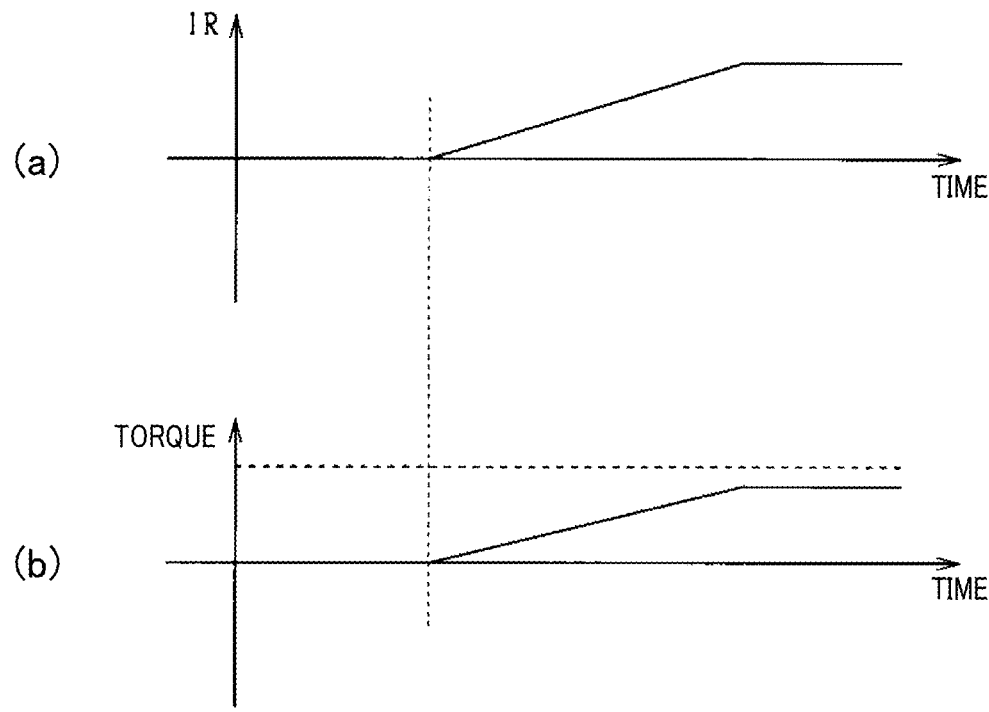
FIG. 21 is a timing diagram showing a transition of a current flowing through a neutral point and a torque in a modified example.
Figure 22:
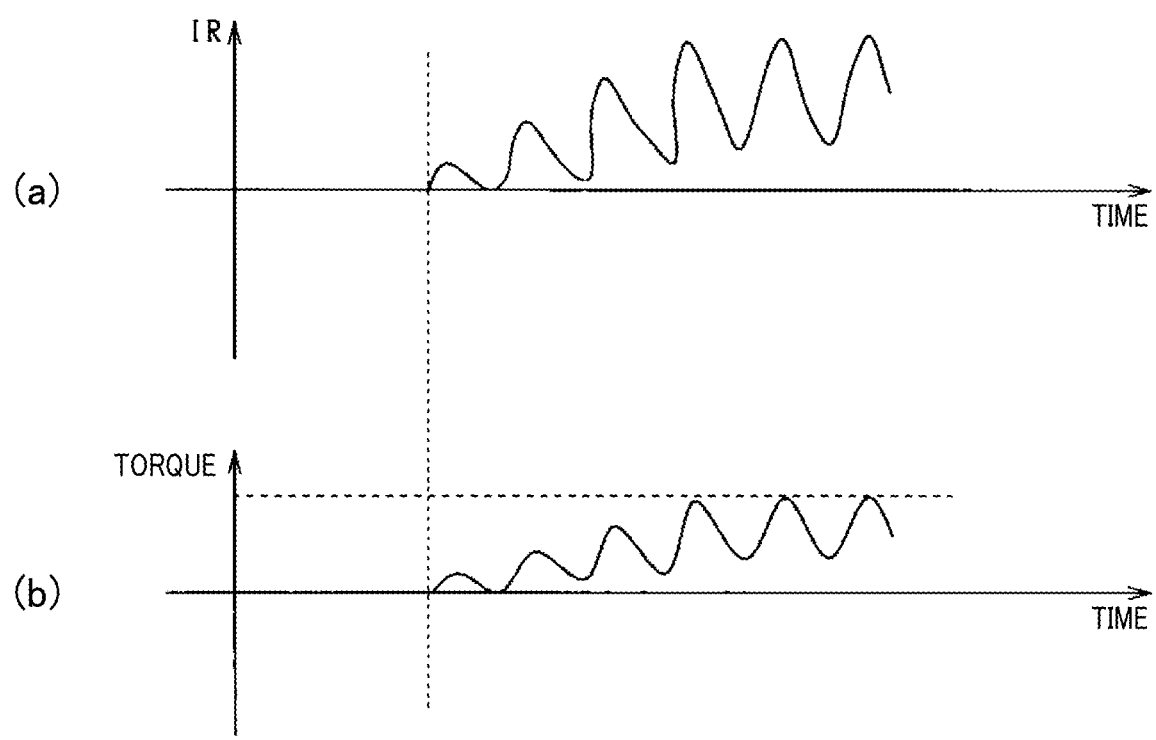
FIG. 22 is a timing diagram showing a transition of a current flowing through a neutral point and a torque in another modified example.

In the above embodiments, the temperature-increase control may be performed by applying a direct current to the battery pack 20 as shown in FIG. 21. Further, as shown in FIG. 22, the temperature-increase control may be performed by applying a combination of a direct current and an alternating current to the battery pack 20.

Although the battery pack 20 is used in the above embodiments, a unit cell may be used.

In the above embodiments, the temperature-increase PWM control may be performed by controlling on/off of two of three phases.

In the above embodiments, the controller 70 may cause a current to flow between the capacitor 31 and the battery pack 20 via the inverter 30 and the winding 41.

In the phase current imbalance control of the fourth embodiment, the same amplitude increase amount $\Delta im/3$ is added or subtracted to unbalance the phase currents. However, the amplitude increase amount to be added and the amplitude increase amount to be subtracted may be different from each other as long as the phase currents become unbalanced between phases.

Although the present disclosure has been described in accordance with the examples, the present disclosure should not be construed as limited to those examples or structures. The present disclosure encompasses various modifications and equivalent alterations. In addition, various combinations and forms, and other combinations and forms including only one element, one or more elements, or one or less elements are also within the scope and spirit of the present disclosure.

(Conclusion)

It is thus desired to provide a power conversion apparatus that does not cause a rotary electric machine to output a torque exceeding a predetermined value during temperature-increase control while a vehicle is stopped.

In order to solve the above problem, a power conversion apparatus may be provided with a power converter having series connections of upper arm switches and lower arm switches and configured to convert DC power supplied from a battery into AC power by switching control, the power conversion apparatus being configured to supply the AC power from the power converter to a rotary electric machine having windings, the rotary electric machine being connected to an axle of a vehicle, the power conversion apparatus comprising: a control unit that performs temperature-increase control of the battery by performing switching control of the upper arm switches and the lower arm switches so that a current flows to the battery via the power converter and the windings, wherein, in the temperature-increase control while the vehicle is stopped, the control unit acquires a current value of the rotary electric machine flowing through a neutral point of the windings and controls the current so that the current value gradually increases within a current control range in which a torque of the rotary electric machine is less than a threshold value.

Thus, in the temperature-increase control while the vehicle is stopped, the controller acquires a current value of the rotary electric machine and controls a current so that the current value gradually increases within a current control range in which a torque of the rotary electric machine is less than a threshold value. As a result, when the temperature-increase control is performed while the vehicle is stopped, a large current does not suddenly flow through the windings of the rotary electric machine, preventing generation of an unintended large torque. Therefore, it is possible to prevent the vehicle from moving.

What is claimed is:

1. A power conversion apparatus provided with a power converter having series connections of upper arm switches and lower arm switches and configured to convert DC power supplied from a battery into AC power by switching control, the power conversion apparatus being configured to supply the AC power from the power converter to a rotary electric machine having windings, the rotary electric machine being coupled to an axle of a vehicle, the power conversion apparatus comprising:

a control unit that performs temperature-increase control of the battery by performing switching control of the upper arm switches and the lower arm switches so that a current flows to the battery via the power converter and the windings, wherein in the temperature-increase control while the vehicle is stopped, the control unit controls the current so that a current value of the rotary electric machine gradually increases within a current control range in which a torque of the rotary electric machine is less than an upper limit torque.

2. The power conversion apparatus according to claim 1, wherein the battery includes a first storage battery and a second storage battery connected in series to an intermediate point, the intermediate point and a neutral point of the windings are electrically connected to each other via a connection path, and the control unit performs switching control of the upper arm switches and the lower arm switches so that a current flows between the first storage battery and the second storage battery via the power converter, the windings and the connection path.

3. The power conversion apparatus according to claim 1, wherein when the current value is gradually increased and reaches the upper limit value of the current control range, the control unit controls the current value so that the current value becomes equal to the upper limit value or less than the upper limit value.

4. The power conversion apparatus according to claim 1, wherein the control unit acquires a position of a rotor of the rotary electric machine, and, when the position of the rotor has moved in the gradual increase of the current value, controls the current value so that the current value becomes less than or equal to the current value during operation.

5. The power conversion apparatus according to claim 1, wherein
the control unit acquires vehicle attitude information regarding a attitude of the vehicle, and changes the upper limit torque according to the vehicle attitude information.

6. The power conversion apparatus according to claim 1, wherein
the control unit causes an alternating current to flow through the windings.

7. The power conversion apparatus according to claim 1, wherein
the control unit is configured to be able to change an increase rate or a decrease rate per unit time of the current value of the rotary electric machine.

8. The power conversion apparatus according to claim 1, wherein
the rotary electric machine includes windings of a plurality of phases, and
the control unit acquires a position of a rotor of the rotary electric machine, and, when the position of the rotor has moved, unbalances phase currents of the windings between phases, based on a direction of the phase currents of the windings and the position of the rotor.

9. The power conversion apparatus according to claim 8, wherein
when unbalancing the phase currents of the windings between phases, the control unit increases an amplitude of at least one phase current of the phase currents of the plurality of phases while decreasing an amplitude of at least one phase current of the phase currents of the plurality of phases.

* * * * *